US006789760B2

(12) United States Patent
Hiraguchi (10) Patent No.: US 6,789,760 B2
(45) Date of Patent: Sep. 14, 2004

(54) RECORDING TAPE CARTRIDGE (75) Inventor: Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/346,185

(22) Filed: Jan. 17, 2003

(65) Prior Publication Data

US 2003/0150948 A1 Aug. 14, 2003

(30) Foreign Application Priority Data

Jan. 18, 2002 (JP) ........................................ 2002-009863

(51) Int. Cl.[7] .............................................. G11B 23/107
(52) U.S. Cl. ....................................................... 242/348
(58) Field of Search .............................. 242/347, 347.1, 242/348, 348.2, 338, 338.1, 338.2, 338.4, 332.4, 332, 326, 326.1, 326.2, 336, 532.6, 332.5, 332.6; 360/95, 96.3, 96.5, 132

(56) References Cited

U.S. PATENT DOCUMENTS

| | | | | |
|---|---|---|---|---|
| 3,861,611 A | * | 1/1975 | Esashi et al. ............ 242/326.2 |
| 4,045,821 A | * | 8/1977 | Fujikura ..................... 360/132 |
| 4,477,851 A | * | 10/1984 | Dalziel et al. ................ 360/95 |
| 5,016,127 A | * | 5/1991 | Inoue et al. |
| 5,673,155 A | * | 9/1997 | Motoyama et al. ......... 242/338 |
| 5,779,172 A | * | 7/1998 | Anderson et al. ........... 242/336 |
| 5,868,333 A | * | 2/1999 | Nayak ........................ 242/338 |
| 5,890,669 A | * | 4/1999 | Buckland et al. ........... 242/336 |
| 6,095,446 A | * | 8/2000 | Buckland et al. ........... 242/336 |
| 6,364,232 B1 | * | 4/2002 | Nemeth et al. .......... 242/332.4 |
| 6,481,658 B1 | | 11/2002 | Shiga et al. |

* cited by examiner

Primary Examiner—William A. Rivera
(74) Attorney, Agent, or Firm—Sughrue Mion, PLLC (57) ABSTRACT A recording tape cartridge which can prevent inclination of a case relative to a loading direction when a door is moved in an aperture opening direction by an operation of loading the cartridge into a drive device. The aperture is closed by a door provided at a corner portion between a front wall and a right wall. An engaging protrusion fixed at the drive device is engaged with an operation protrusion of the door by the operation of loading the cartridge into the drive device in an arrow A direction, and the aperture is opened. At this time, an engaging member provided at a bucket which moves in the arrow A direction with the case engages with an engagement surface of a cell retention notch provided at a left end portion of the case. Thus, torque that acts on the case in accordance with opening of the aperture is counteracted.

24 Claims, 9 Drawing Sheets

RECORDING TAPE CARTRIDGE

BACKGROUND OF THE INVENTION

1. Field of the Invention

The present invention relates to a recording tape cartridge which rotatably accommodates a single reel onto which a recording tape such as a magnetic tape or the like is wound.

2. Description of the Related Art

Recording tapes such as magnetic tapes and the like are used as external recording media for computers and the like. Recording tape cartridges that accommodate a single reel on which a recording tape is wound take up little space when stored and can record large amounts of information, and are employed as such recording tapes.

A recording tape wound on a single reel is rotatably accommodated in a case of such a recording tape cartridge. The case is formed by joining an upper case and a lower case, which are each formed of resin material. An opening aperture is formed in this case. The recording tape is drawn out through this opening, and wound on a drive device side winding reel.

Accordingly, in order that dust and the like does not ingress through the opening aperture and adhere to the recording tape, the opening aperture is opened and closed by a door, which is a covering member. Specifically, the opening aperture is closed by the door when the recording tape cartridge is not in use, and the door displaces or rotates to open up the opening aperture when the recording tape cartridge is to be used.

As a recording tape cartridge that is provided with such a door, a well-known structure includes: an opening aperture formed in a side wall of a case along a loading direction into a drive device; a door which slides along the direction of loading at an inner side of the side wall for opening and closing the opening aperture; a spring which urges the door in a direction of closing the opening aperture; and an operation portion provided at the door, which is engaged with an opening/closing member of the drive device and slid in a direction of opening the opening aperture by an operation of loading the case into the drive device.

In this structure, the operation portion provided at the door is engaged with an opening member fixed in the drive device (which moves relative to a bucket of the drive device) and slid relative to the case to open the opening aperture by a simple operation of loading the case (i.e., the recording tape cartridge) into the drive device, that is, by moving the case, which has been loaded on the bucket, in the loading direction together with the bucket. Therefore, it is sufficient simply that the opening member is fixedly disposed at a position that enables engagement with the operation portion. Thus, structure thereof is simple.

However, in a conventional recording tape cartridge as described above, when the operation portion of the door engages with the opening member of the drive at a time of opening the opening aperture, a torque (or movement of rotation) acts around the point of engagement, the case (i.e., the recording tape cartridge) rotates around the point of engagement, and there is a problem in that the case becomes inclined relative to the direction of loading. In particular, because the opening is opened against urging force of the spring, this torque (pushing force in the loading direction) is large, and the case is more susceptible to inclination in the drive device.

As the case is pushed into the drive device in this state, the case may scrape against the drive device, the case may be damaged, abrasion dust may be generated in the drive device, and the case may become stuck in the drive device.

Accordingly, in order to counteract this torque, a structure has been considered in which an engaging member provided at the bucket of the drive device engages at a position on a face at a leading end side in the loading direction of the lower case (a front face), which position is separated from the side wall in which the opening is formed, and this state of engagement is maintained while the case moves in the loading direction with the bucket and the opening aperture is opened.

However, with a case formed by joining up an upper case and lower case formed of resin material as described above, a draft angle for die cutting, after outer faces including the front face have been formed as design surfaces on which texturing processing or the like is carried out, is large, and dimensional accuracy is low. When the engaging member of the drive device engages at the front face of such a case, positional accuracy of the case on the bucket is low and, even though the torque is counteracted, the case will be slightly angled on the bucket while the case is loaded into the drive device. This may lead to smooth movement of the door (that is, the operation of opening the opening aperture) being hindered, and there is a problem in that force components may act in directions other than the direction of opening the opening aperture.

Further, the front face of the lower case is angled downwards with respect to the direction of loading because of the aforementioned draft angle. Therefore, because of a reactive force when the torque is counteracted, force acts on the case in a direction of lifting up the front portion of the case. As a result of this force, the case is angled in a vertical direction with respect to the loading direction, and this also may lead to smooth movement of the door being hindered.

SUMMARY OF THE INVENTION

In consideration of the circumstances described above, an object of the present invention is to provide a recording tape cartridge which can avoid inclination of a case with respect to a loading direction when a door is moved in an opening direction by an operation of loading the cartridge into a drive device.

In order to achieve this object, in accordance with a first aspect of the present invention, a tape cartridge insertable into a tape drive that includes an opening member and an engaging member, which are capable of operatively engaging with the tape cartridge at a time of insertion of the tape cartridge, and carries out at least one of reading and writing of data is provided. This tape cartridge includes: (a) a case; (b) a tape access opening provided at one side relative to a center line of the case, the center line extending in a direction of the insertion of the cartridge; (c) a covering member which is reciprocally moveable between a closed position for closing the tape access opening and an open position for opening the tape access opening; (d) an operation portion which cooperates with the opening member of the tape drive at the cartridge insertion time and moves the covering member in the direction of the open position; and (e) an engagement portion provided at the other side relative to the centre line of the case and capable of cooperating with the engaging member of the tape drive at the cartridge insertion time.

Preferably, the case recess portion is capable, at the cartridge insertion time, of functioning to counterbalance movement of the covering member in the direction of the closed position.

Further, in accordance with another aspect of the present invention, a tape drive for carrying out at least one of reading and writing of data at an insertable and removable tape cartridge is provided. This tape drive includes: (A) an opening member capable of operatively engaging with the tape cartridge at a time of insertion of the cartridge; and (B) an engaging member capable of operatively engaging with the tape cartridge at the cartridge insertion time, and (C) the tape cartridge includes: (a) a case; (b) a tape access opening provided at one side relative to a center line of the case, the center line extending in a direction of the insertion of the cartridge; (c) a covering member which is reciprocally moveable between a closed position for closing the tape access opening and an open position for opening the tape access opening; (d) an operation portion which cooperates with the opening member of the tape drive at the cartridge insertion time and moves the covering member in the direction of the open position; and (e) an engagement portion provided at the other side relative to the centre line of the case, which cooperates with the engaging member of the tape drive and is capable of implementing a counterbalancing function with respect to movement of the covering member in the direction of the closed position.

DESCRIPTION OF THE PREFERRED EMBODIMENTS

A recording tape cartridge 10 relating to an embodiment of the present invention will be described on the basis of FIGS. 1 to 9. First, general overall structure of the recording tape cartridge 10 will be described. Then an opening, a door and a cell retention notch 58 will be described. The door serves as a covering member. The cell retention notch 58 serves as a recess portion which is a principal portion of the present invention.

Figure 1:
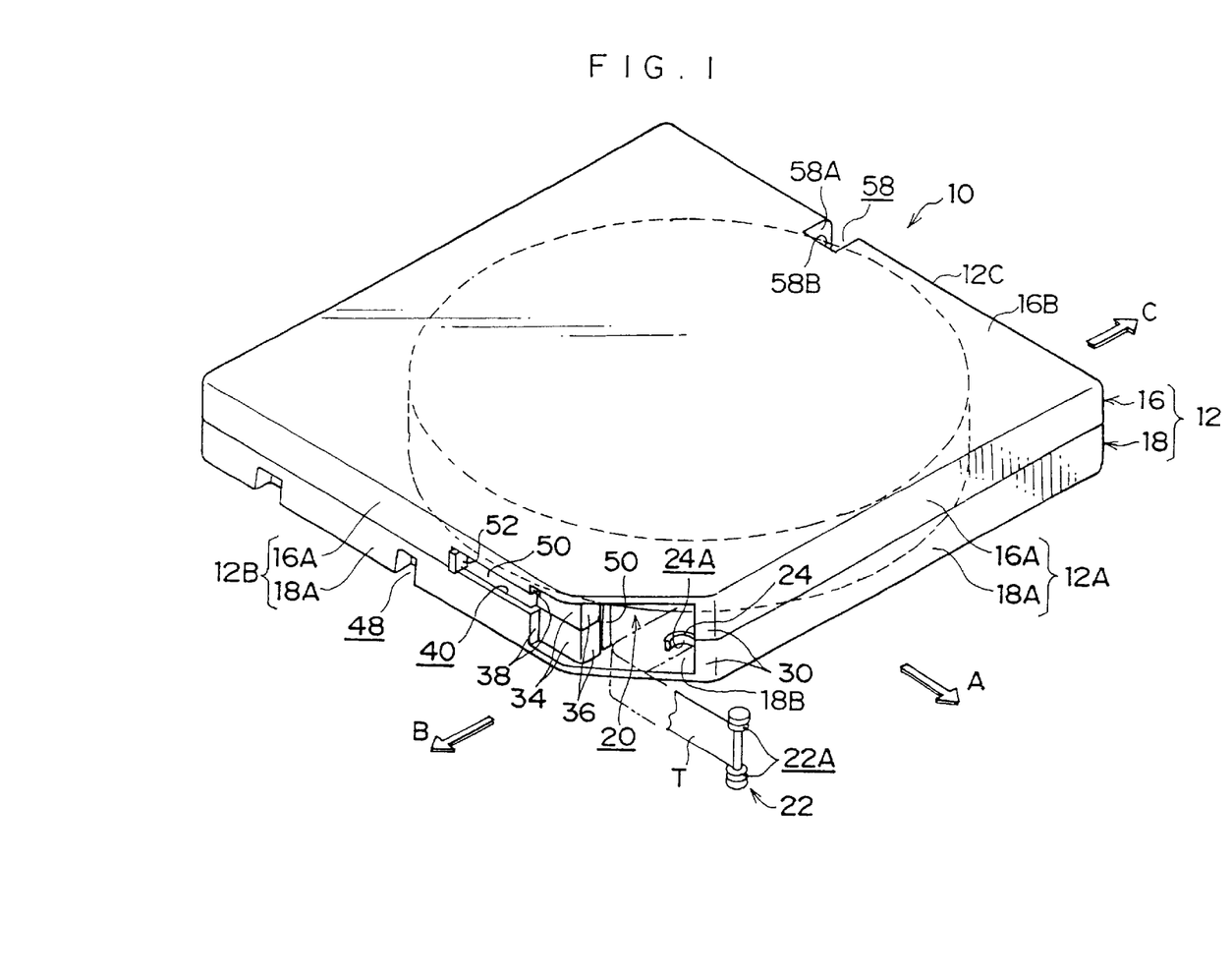
FIG. 1 is a perspective view showing overall structure of a recording tape cartridge relating to an embodiment of the present invention.
Figure 2:
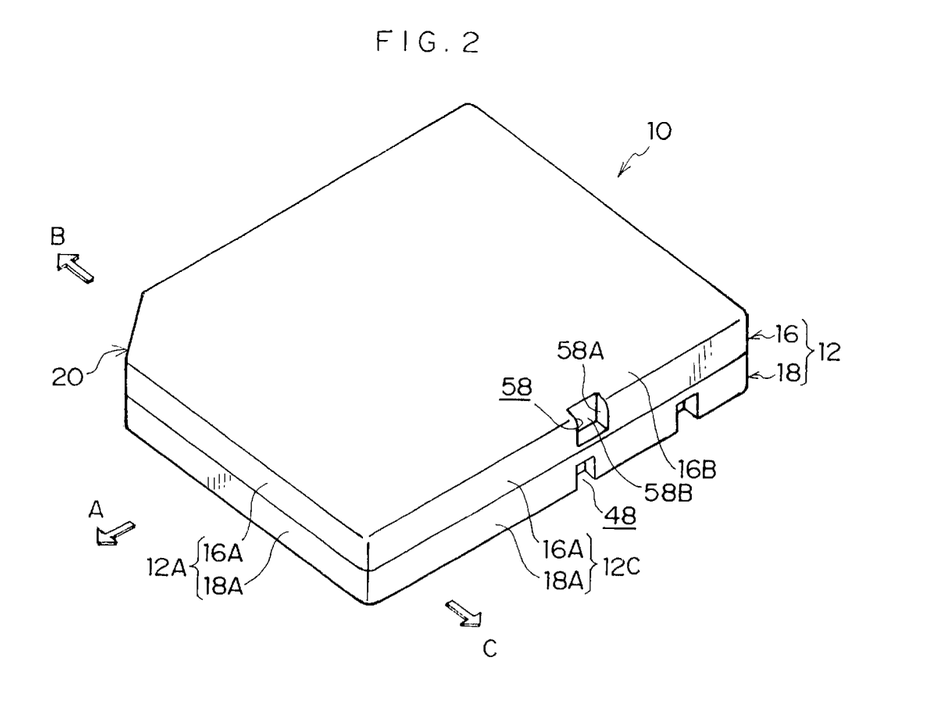
FIG. 2 is a perspective view showing overall structure of the recording tape cartridge relating to the embodiment of the present invention, viewed from another direction.
Figure 3:
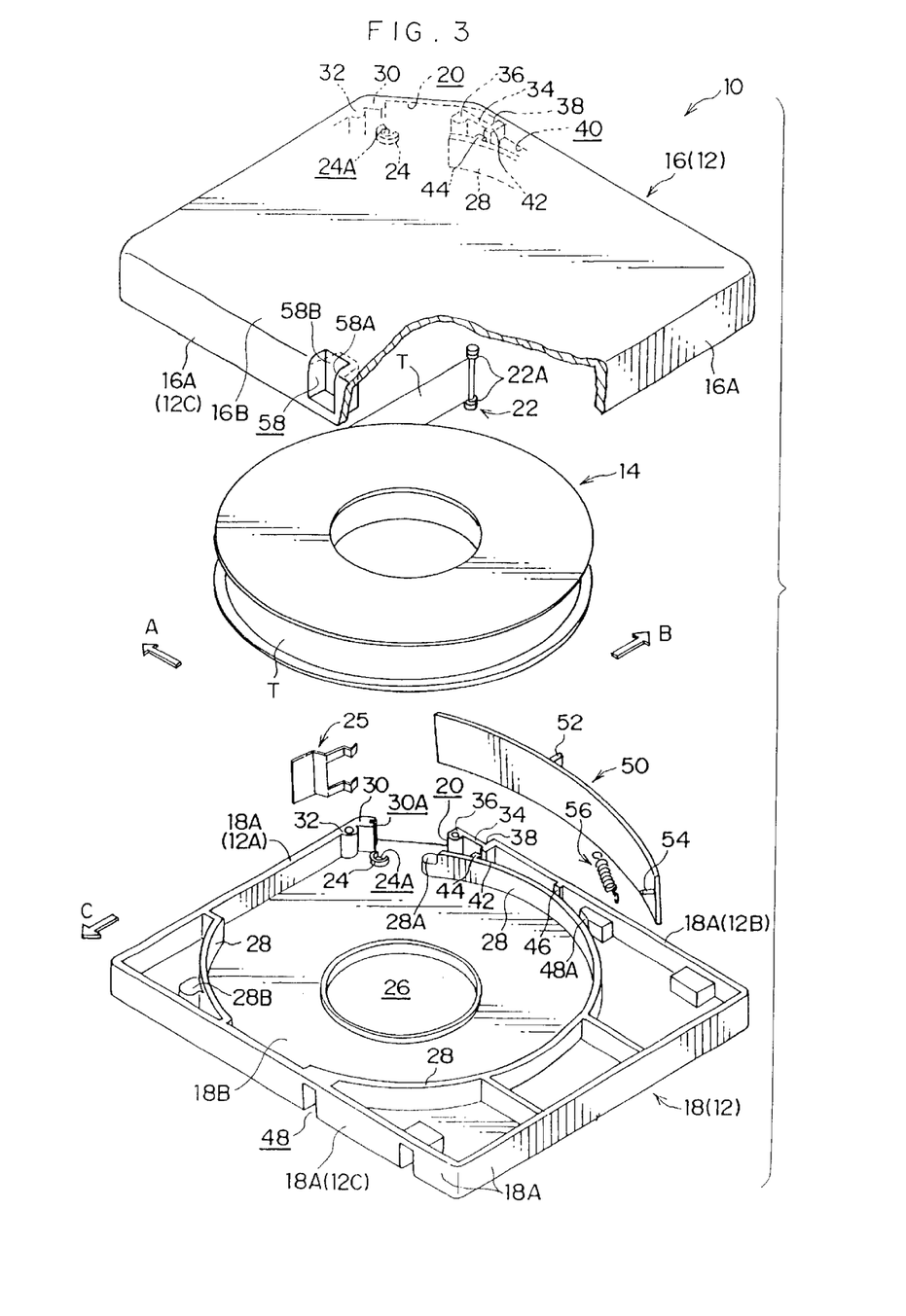
FIG. 3 is an exploded perspective view of the recording tape cartridge relating to the embodiment of the present invention.

For convenience of explanation, a loading direction of the recording tape cartridge 10 into a drive device, which is shown as arrow A, is referred to as a forward direction (front side) of the recording tape cartridge 10, and the directions of an arrow B and an arrow C intersecting arrow A are a rightward direction and a leftward direction, respectively.
Overall Structure of Recording Tape Cartridge FIGS. 1 and 2 show perspective views of overall structure of the recording tape cartridge 10. FIG. 3 shows a schematic exploded perspective view of the recording tape cartridge 10.

As shown in these drawings, the recording tape cartridge 10 is structured to rotatably accommodate a single reel 14 in a case 12. The case 12 is substantially rectangular in plan view. A magnetic tape T is wound onto the reel 14. The magnetic tape T serves as a recording tape which is an information recording/replaying medium.

The case 12 is structured by matching up and joining peripheral walls 16A and 18A of an upper case 16 and a lower case 18 to one another. A front-right corner portion of each of the upper case 16 and the lower case 18, which is a single corner portion at a leading side in the direction of loading into the drive device, is cut away. An accommodation space for the reel 14, onto which the magnetic tape T is wound, is provided inside the case 12. Hence, the cut away corner portions of the peripheral walls 16A and 18A of the upper case 16 and the lower case 18 serve as an opening 20 for drawing out the magnetic tape T.

A leader pin 22 is connected at a free end of the magnetic tape T that is drawn out through the opening 20. The leader pin 22 is caught up (engaged) by drawing-out means of the drive device, and subjected to a drawing-out operation. At each of two end portions of the leader pin 22, which protrude beyond width direction end portions of the magnetic tape T, an annular groove 22A is formed. These annular grooves 22A are caught on to by hooks or the like of the drawing-out means. Consequently, in this structure, the hooks or the like do not contact and damage the magnetic tape T when the magnetic tape T is drawn out.

At an inner side of the opening 20 of the case 12, a pair of upper and lower pin stands 24 are provided for positioning and retaining the leader pin 22 in the case 12. The pin stands 24 have hemi-tubular forms, and both the end portions of the leader pin 22 are held at recess portions 24A of the pin stands 24 in a state in which the leader pin 22 is standing thereat. Outer peripheral walls of the pin stands 24 are open at a magnetic tape T drawing-out side thereof, to form exit/entry apertures at which the leader pin 22 is removed and inserted.

A leaf spring 25 is fixedly disposed in a vicinity of the pin stands 24. The leaf spring 25 engages with upper and lower end portions of the leader pin 22, and holds the leader pin 22 at the pin stands 24. The leaf spring 25 is structured to resiliently deform appropriately when the leader pin 22 is removed or inserted at the pin stands 24, and allow movement of the leader pin 22.

A gear aperture 26 is formed at a central portion of a floor plate 18B of the lower case 18. The gear aperture 26 is for exposing an unillustrated reel gear of the reel 14 to the outside. The reel gear meshes with a driving gear of the drive device, and the reel 14 is driven to rotate in the case 12. Further, the reel 14 is held by free play-restricting walls 28 so as not to rattle about. The free play-restricting walls 28 are provided projecting at interior surfaces of a ceiling plate 16B of the upper case 16 and the floor plate 18B of the lower case 18, to serve as interior walls (in short tubular shapes from which portions are cut away) on a circular path which is coaxial with the gear aperture 26. The free play-restricting walls 28 are cut away at a vicinity of the opening 20.

A hollow portion 28A is provided continuously with an end portion of the free play-restricting walls 28 in the vicinity of the opening 20. A hole for regulation of position at an interior is formed in the hollow portion 28A. In addition, a hollow portion 28B is formed continuously with the free play-restricting walls 28 at an inner side of a front-left corner portion of the case 12. Another hole for regulation of position, which is a long hole, is formed in the hollow portion 28B. The hollow portion 28A and the hollow portion 28B are disposed co-linearly along a left-right direction (the direction of arrows B and C).

Structure of Opening and of Case at Opening Vicinity

As described above, the opening 20 is formed by cutting away the front-right corner portion of the case 12. Therefore, an opening face thereof faces in the direction of arrow A and in the direction of arrow B.

Figure 5:
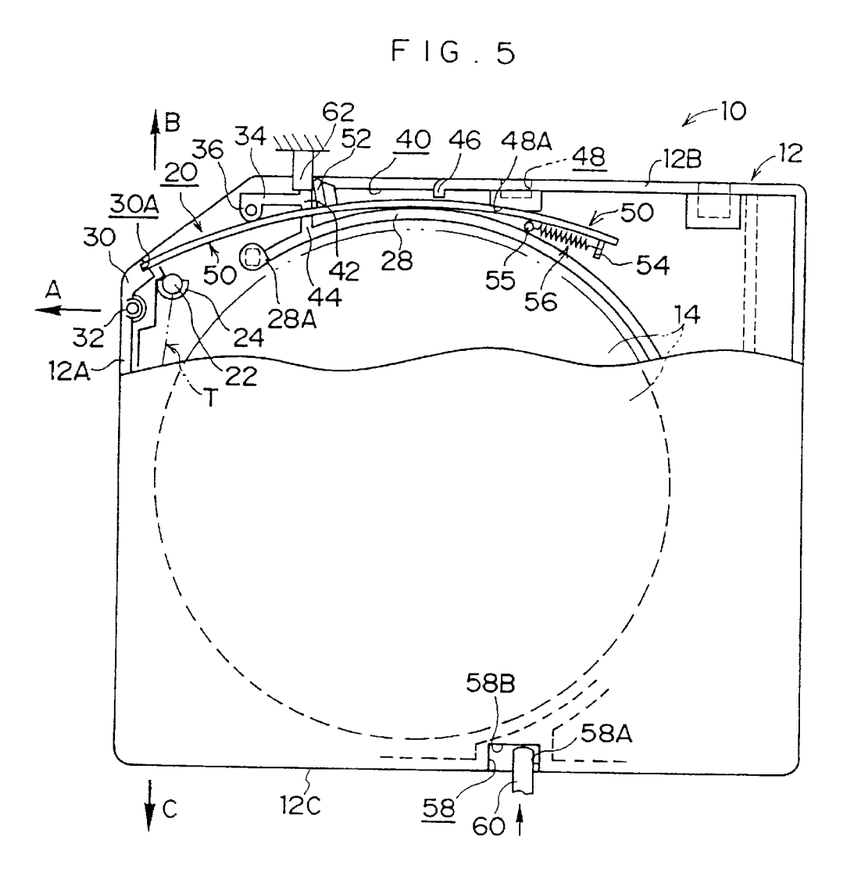
FIG. 5 is a partially cut away plan view showing a state before an opening aperture of the recording tape cartridge relating to the embodiment of the present invention is opened by a drive device.
Figure 6:
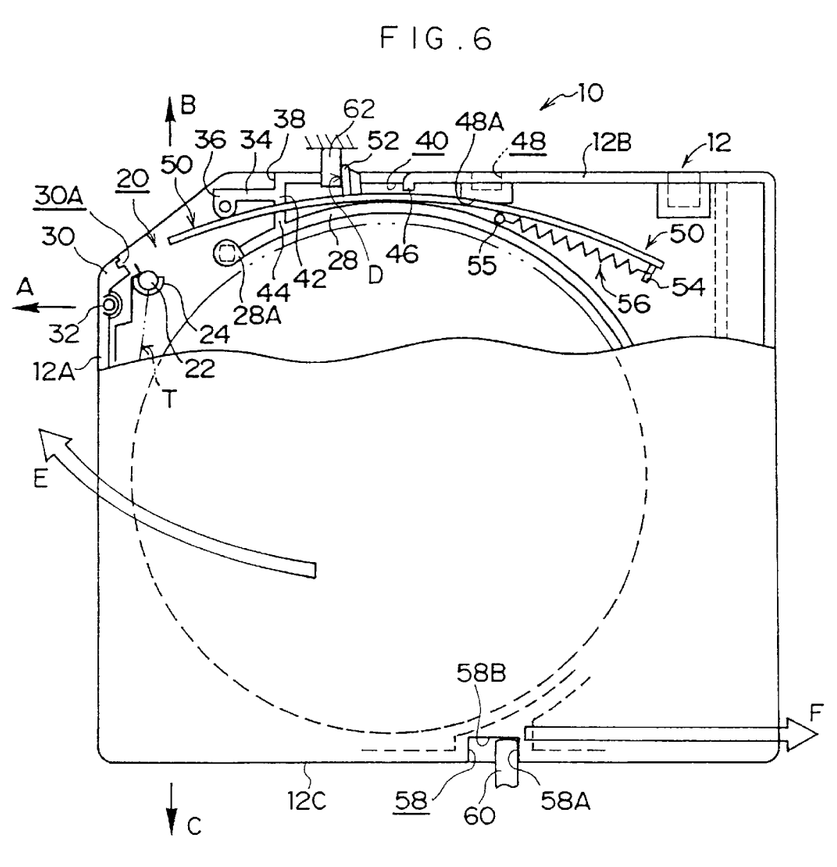
FIG. 6 is a partially cut away plan view showing a state while the opening aperture of the recording tape cartridge relating to the embodiment of the present invention is being opened by the drive device.
Figure 7:
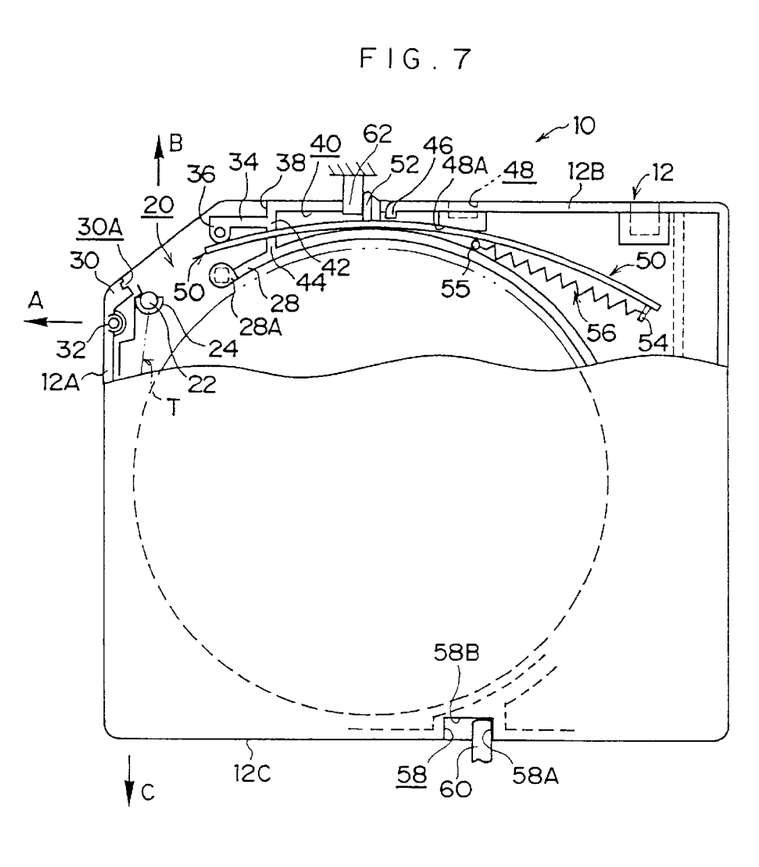
FIG. 7 is a partially cut away plan view showing a state in which the opening aperture of the recording tape cartridge relating to the embodiment of the present invention has been opened by the drive device.

As is also shown in FIGS. 5 to 7, a pair of short upper and lower diagonal wall portions 30 is provided at a right end portion of a front wall 12A of the case 12 (a portion of the peripheral walls 16A and 18A whose outer surface faces in the direction of arrow A). The diagonal wall portions 30 define a front edge portion of the opening 20. The diagonal wall portions 30 curve to run along the opening face of the opening 20, and a wall thickness of the diagonal wall portions 30 is thicker than the front wall 12A.

A recess portion 30A is formed at a thickness direction central portion of the diagonal wall portions 30. A distal end of a door 50, which is described later, enters into the recess portion 30A. Furthermore, a pair of upper and lower screw bosses 32 are provided continuously with an inner side of the front wall 12A in a vicinity of a left end of the diagonal wall portions 30.

A pair of upper and lower offset wall portions 34 is provided at a front end portion of a right wall 12B of the case 12 (of the peripheral walls 16A and 18A, a right side wall along the direction of arrow A). The offset wall portions 34 are slightly offset to the inside of the case 12 (leftward). Front ends of the offset wall portions 34 define a rear edge of the opening 20.

A pair of upper and lower screw bosses 36 is provided continuously with an inner side of front end portions of the offset wall portions 34. Outer peripheral portions of the screw bosses 36 function as a guide for the door 50 which is slideable against the door 50 (to prevent rattling). Further, a pair of upper and lower step portions 38 is integrally formed between rear end portions of the offset wall portions 34 and the right wall 12B.

Figure 4:
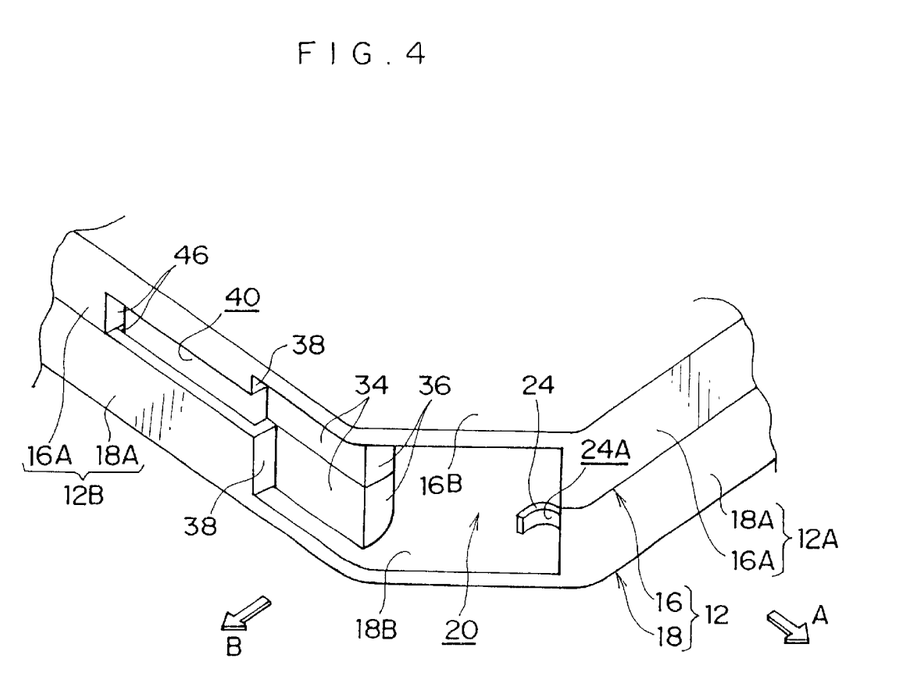
FIG. 4 is a perspective view, from which a door and the like are excluded, showing a slit of a case that structures the recording tape cartridge relating to the embodiment of the present invention.

As shown in FIG. 4, a slit 40 is provided in the right wall 12B, rearward of the offset wall portions 34. The slit 40 has a predetermined length and serves as a window portion communicating between the interior and exterior of the case 12. The slit 40 is for exposing an operation projection 52 of the later-described door 50. The slit 40 is formed by cutting away a lower portion of the peripheral wall 16A that structures the right wall 12B. A lower portion of the step portion 38 that is at the upper case 16 is also cut away. As a result, the slit 40 also opens forward. That is, a lower end portion of the slit 40 is defined by upper end faces of the peripheral wall 18A and the step portion 38 of the lower case 18. Consequently, the slit 40 is positioned upward relative to an abutment portion of the lower case 18 and the upper case 16 (a partition line), and the slit 40 corresponds with the cell retention notch 58 (described later), which is positioned upward relative to the partition line.

Because the upper and lower ends of the slit 40 are defined by a portion of the peripheral wall 16A and by the peripheral wall 18A, which also function as ribs, rigidity of the case 12 is maintained, which is preferable in view of strength thereof when dropped. Moreover, because the slit 40 is provided separately from the opening 20, with the offset wall portions 34 interposed therebetween, rigidity of a corner portion at the rear edge of the opening 20 is increased, and this is further preferable in view of strength when dropped.

A protrusion portion 42 protrudes from rear end portions of the upper and lower offset wall portions 34, at a side thereof which is opposite to a side thereof at which the step portions 38 are disposed (that is, inward of the case 12) and is provided to span the whole height of the offset wall portions 34. A distal surface of the protrusion portion 42 is curved to correspond to an outer surface of the later-described door 50. In addition, a protrusion portion 44 spanning the whole height is provided at a location of the free play-restricting walls 28 which corresponds to the protrusion portion 42. The protrusion portion 44 is curved to correspond with an inner face of the door 50, and opposes the protrusion portion 42.

When the door 50 opens or closes the opening 20, the protrusion portion 42 and the protrusion portion 44 are slideable against the door 50 while sandwiching the door 50. Thus, the protrusion portion 42 and the protrusion portion 44 serve to prevent the ingression of dust into the case 12, and to guide the door 50 (preventing looseness).

A further protrusion portion 46 protrudes inward of the case 12 at a portion of the right wall 12B (the peripheral walls 16A and 18A) that defines a rear end of the slit 40. The protrusion portion 46 also serves to prevent the ingression of dust into the case 12 and to guide the door 50 (preventing rattling).

A recess portion 48 is formed rearward of the protrusion portion 46 of the lower case 18. The recess portion 48 is recessed toward the inside of the case 12 at a portion of the peripheral wall 18A (which does not include an upper end of the peripheral wall 18A) and upward from a lower face of the case 12 (the floor plate 18B is cut away), and substantially has a three-sided box shape in sectional view. The recess portion 48 is also formed in a left wall of the case 12. These recess portions 48 serve as, for example, engaging portions for engaging with drawing-in means of the drive device, with bottom surfaces of the recess portions 48 (surfaces that face downward) serving as reference surfaces for positioning in the drive device. Moreover, twisting strength of the case 12 is improved by provision of the recess portions 48.

A portion of the right wall 12B (the peripheral wall 18A) that defines the recess portion 48 is curved to correspond to the outer surface of the door 50. This guide surface 48A serves as a guide for the door 50, and is slideable against the outer surface of the door 50 when the opening 20 is opening or closing (to prevent looseness).

The upper case 16 and lower case 18 described above are fixed coined) by unillustrated screws which are screwed from the lower side into each of the screw bosses 32 and 36, which are located in the vicinities of edge portions of the opening 20. Accordingly, corner portions at both ends of the opening 20, which are defined by free ends of the diagonal wall portions 30 (the front wall 12A) and the offset wall portions 34 (the right wall 12B) and which tend to be severely affected when impacted against a floor or the like by a fall, are securely joined. Thus, even if the case 12 is dropped, this structure will not be deformed or buckled by the whole weight of the recording tape cartridge 10, so as to cause mispositioning.

A major diameter across the threads of the screws may be set to, for example, 2.0 mm. Thus, an external diameter of the screw bosses 32 and the screw bosses 36 may be set to 4.0 mm. Instead of this fixing with screws, projections may project from the upper case 16 at positions corresponding to the screw bosses 32 and 36, while fitting holes which fit with these projections are formed in the lower case 18, and the projections and fitting holes may be fitted with one another. However, in such a case, it is desirable that the upper case 16 and the lower case 18 be fixed with screws at locations within radii of 30 mm of these fitting locations. Further, matching surfaces of the peripheral wall 16A and the peripheral wall 18A (at both side corner portions of the opening 20) may be fixed by welding. However, fixing with screws is more preferable in consideration of dismantling and recycling.

Plate thicknesses of both the upper case 16 and the lower case 18 are set to 2 mm at the area in which the pin stands 24 are disposed (the vicinity of the opening 20), which is thicker than thicknesses at other areas thereof. The case 12 (the upper case 16 and the lower case 18) is formed of a polycarbonate (PC) material. The case 12 may be formed of acrilonitrile butadiene styrene (ABS) or a metal instead of PC.

The purpose of this thickening is to raise the strength of the vicinity of the pin stands 24, which is the location at which the leader pin 22 is held (positioned). Therefore, mispositioning of the leader pin 22, which is a most important component for functioning of the recording tape cartridge 10 (and which must be properly engaged with the drawing-out means when the recording tape is to be drawn out), subsequent to impacts due to dropping of the case 12 (the recording tape cartridge 10) or the like does not occur.

Positions at which the pin stands 24 are disposed are determined such that an axial center of the leader pin 22 held thereat is positioned on a first imaginary line (not illustrated), which joins the front and rear edge portions of the opening 20, or further inside the case 12 than the first imaginary line. The positions at which the pin stands 24 are disposed are more preferably determined such that the axial center of the leader pin 22 is positioned on a second imaginary line (also not illustrated), which joins axial centers of the screw bosses 32 and the screw bosses 36, or further inside the case 12 than the second imaginary line. In the present embodiment, the pin stands 24 are disposed at a position closer to the screw bosses 32 than to the screw bosses 36. Thus, with this structure, mispositioning of the leader pin 22 due to vibrations of the ceiling plate 16B and the floor plate 18B that accompany dropping of the case 12 or the like can be prevented.

In this case 12, the peripheral wall 16A of the upper case 16 and the peripheral wall 18A of the lower case 18 are set to equal heights. Thus, machining accuracies of portions thereof that match up with one another (accuracies of resin-forming in molds) are at about the same level. Thus, assembly characteristics and dropping impact resistance are made favorable.

A diagonal angle of the opening face of the opening 20 with respect to the direction of arrow A (a diagonal angle of the ceiling plate 16B and floor plate 18B of the case 12 that define the top and bottom of the opening 20) is determined in accordance with requirements for distinguishing (identifying) the recording tape cartridge 10 at a library apparatus 70, which is described later. In a case where the library apparatus 70 handles a plurality of types of the recording tape cartridge 10 and a plurality of types of drive device, it is necessary to identify a generation, recording capacity or the like of the recording tape cartridge 10. The diagonal angle of the opening face of the opening 20 may be utilized for this identification.

Accordingly, the opening 20 for drawing out the magnetic tape T, which has been implemented in consideration of strength as described above, can also function as an identification portion in the library apparatus 70, based on the diagonal angle of the opening face of the opening 20 (to be specific, the diagonal angle of the ceiling plate 16B and floor plate 18B that define the top and bottom of the opening 20). Therefore, insufficient strength of the case 12, a deterioration of dustproofing, and more complicated mold structure, which are concerns in a situation in which the opening 20 and the identification portion are provided separately (for example, a case in which one or a plurality of through-holes formed in the case 12 serves as an identification portion), can be avoided.

The opening 20 described above is formed by cutting away the front-right corner portion. Thus, the opening 20 faces in the direction of arrow A and in the direction of arrow B (the opening surface is angled with respect to the direction of arrow A). Accordingly, the drawing-out means of the drive device can gain access and chuck the leader pin 22 from the direction of arrow A, the direction of arrow B, or a direction between the directions of arrow A and arrow B. Therefore, an area in which the pin stands 24 that hold the leader pin 22 can be disposed is made larger, and a region in which the drawing-out means of the drive device can chuck the leader pin 22 is made larger. Thus, positions at which the pin stands 24 are disposed can be specified to suit specifications of drive devices that carry out chucking from the direction of arrow A or the direction of arrow B. Moreover, because the operation path of the door 50, as described below, does not interfere with positions at which the leader pin 22 can be disposed in practice, a degree of freedom of design of the drive device is improved.

If the drive device is structured such that the drawing-out means thereof accesses the leader pin 22 through the front face side, facing in the direction of arrow A, of the 12, then a drawing-out path of the magnetic tape T can be minimized in length, and the drawing-out means does not have to include a drive mechanism such that the magnetic tape T is turned around from the arrow B side of the case 12. Thus, a reduction in size and cost reductions can be expected. Further, when the length of the path for drawing out the magnetic tape T is minimized as described above, a running path of the magnetic tape T will inevitably be shortened too. As a result, contact friction of the magnetic tape T with tape guides (for example, rotatably supported rollers and the like) can be reduced.

Structure of Door

As shown in FIGS. 5 to 7, which are viewed with a portion of the upper case 16 cut away, the opening 20 described above is opened and closed by the door 50, which serves as the covering member. A plate breadth (height) of the door 50 is substantially the same as an opening height of the opening 20, and a plate length of the door 50 is significantly greater than an opening width of the opening 20. The door 50 is formed in a circular arc form in plan view, with a plate thickness direction of the door 50 being curved along a predetermined circular circumference.

Specifically, in this structure, in a state in which the door 50 has entered into the recess portion 30A of the diagonal wall portions 30, the door 50 closes the opening 20 (see FIG. 5). The door 50 opens the opening 20 by moving (rotating) substantially rearward along the aforementioned circular circumference, (see FIG. 6). When an outer peripheral surface of a distal end vicinity of the door 50 reaches a vicinity of the screw bosses 36, the opening 20 is completely opened (see FIG. 7). When the opening 20 is open, the door 50 closes the opening 20 by rotating substantially in the opposite direction. In the closed state of the opening 20, the door 50 abuts against at least one of the screw bosses 36, the protrusion portion 42 and the protrusion portion 44.

That is, the door 50 is formed to be curved in an arc shape corresponding to the predetermined circular circumference, which is the movement path of the door 50. In the present embodiment, a position of a center of rotation of the door 50 in a left-right direction is specified to be at a left end vicinity of the case 12, and a position thereof in a front-rear direction is specified to be at a vicinity of the rear end of the slit 40. Consequently, the movement path of the door 50 is closest to the right wall 12B of the case 12 in the vicinity of the rear end of the slit 40. The rotation center and a turning radius of the door 50 may be suitably determined in accordance with the positions of the front and rear edge portions of the opening 20 (the diagonal wall portions 30 and the screw bosses 36), which are determined by requirements of the drive device, in accordance with the angle of the facing surface of the opening 20, which is determined by requirements of the library apparatus 70, and the like.

A rear end portion of a length dimension along the curve of the door 50 is determined so as to be located at a rear-right corner portion, which is rearward of the recess portion 48 of the case 12, in the state in which the opening 20 is closed. Accordingly, all through the process of opening and closing the opening 20, the door 50 is guided (looseness thereof is restrained) by the screw bosses 36, the protrusion portions 42, 44 and 46, and the guide surface 48A (and the free play-restricting walls 28) of the case 12.

At an outer peripheral surface of the door 50, slightly forward from a length direction central portion thereof, the operation projection 52 projects along a diametric direction of the door 50, to serve as an operation portion. The operation projection 52 is exposed at the outer side of the case 12 through the slit 40. When the opening 20 is in the closed state, the operation projection 52 is positioned to be slightly separated from the protrusion portion 42 at the rear end of the offset wall portions 34, and is operable through the portion of the slit 40 that opens frontward at the step portions 38. Dimensions of each portion are determined such that a distal end portion of the operation projection 52 does not protrude further than the outer surface of the right wall 12B (an exterior profile of the case 12) in this state (see FIG. 5).

When the opening 20 is in the opened state, the operation projection 52 is positioned to be slightly separated from the protrusion portion 46 at the rear edge of the slit 40. The dimensions of each portion are determined such that a length direction of the operation projection 52 is substantially perpendicular to the right wall 12B of the case 12 (the direction of arrow A) in this state (see FIG. 7).

Thus, although this operation projection 52 communicates between the interior and exterior of the case 12 via the slit 40 for exposure, the slit 40 is always substantially closed by the door 50, which spans substantially the whole height of the interior of the case 12, and by the protrusion portions 42 and 46 which guide the door 50. In addition, a labyrinthine structure is formed between the slit 40 and the accommodation space for the reel 14 by the free play-restricting walls 28 which serve as inner walls and the protrusion portion 44 which guides the door 50. Accordingly, adherence of dust and the like to the magnetic tape T wound onto the reel 14 is prevented.

A spring-holding portion 54 protrudes along the diametric direction of the door 50 from an interior peripheral portion of the door 50 at a rear end vicinity thereof. One end portion of a coil spring 56, which serves as urging means, is engaged with a spring-engaging portion 55, which is provided inside the case 12 at a vicinity of the recess portion 48. Another end portion of the coil spring 56 is engaged and held at the spring-holding portion 54. Accordingly, in this structure, the door 50 is urged in a direction to close the opening 20 by urging force of the coil spring 56, and thus the door 50 closes the opening 20.

The coil spring 56 has a length that reaches the rear-right corner portion of the case 12 in the state in which the door 50 closes the opening 20 as described above. Thus, the coil spring 56 is disposed so as to effectively use a space between the free play-restricting walls 28 and the peripheral walls 16A and 18A at the rear-right corner portion.

The door 50 described hereabove is formed of, for example, a polyoxymethylene (POM) resin, which has a low coefficient of friction and has excellent abrasion resistance with respect to the case 12 constituted of PC. The operation projection 52, the spring-holding portion 54 and the like may be structured as separate bodies (of different materials). Thus, because operation of the door 50 can be carried out smoothly, it is preferable if clearances between end surfaces at the top and bottom of the door 50 and the ceiling plate 16B and floor plate 18B of the case 12 are set to the order of 0.05 mm to 0.2 mm each.

In the structure described above, when the operation projection 52 is engaged (cooperates) with an engaging protrusion 62 of the drive device by an operation of loading the recording tape cartridge 10 into the drive device, the door 50 moves relative to the case 12 against urging force of the coil spring 56, and opens the opening 20. At a time of ejection from the drive device, the door 50 is urged by the urging force of the coil spring 56, and closes the opening 20.

The door 50, which is curvedly formed in the circular arc shape, is rotated to opens and close the opening 20 by swinging around an outer side of the reel 14 and the pin stands 24 (and the leader pin 22) without deviating from the movement path along the shape of the curvature. Thus, the door 50 has a structure that does not deviate from an external profile region of the case 12 during opening and closing of the opening 20. Consequently, a space for accommodation of the recording tape cartridge 10 in the drive device is small, and the movement path of the door 50 does not interfere with the pin stands 24 of the case 12 (the leader pin 22), the reel 14 and the like. Moreover, because the door 50 opens and closes the opening 20 without deviating from the movement path along the shape of the curvature, and an operation region thereof is small, the corner portion of the case 12 can be greatly cut away, and the opening 20 can be formed to be large. In particular, a center of rotation of the door 50 for opening and closing the opening 20, whose opening face is diagonal with respect to the direction of arrow A, can be determined independently of the position of an axial center of the reel 14. Therefore, the angle of inclination of the opening face of the opening 20 relative to the direction of arrow A, the size of the opening 20 (a separation between front and rear edge portions thereof), and the like can be freely specified. Thus, the door 50 can be provided for opening and closing the opening 20, with the opening 20 having dimensions and shape freely selected in accordance with requirements of the drive device and the like. That is, with the structure in which the door 50 is provided, a degree of freedom of design of the opening 20 (and thus of the recording tape cartridge 10) is improved.

Furthermore, because the door 50 is a separate member from the leader pin 22 that is drawn out from the case 12, in this structure the door 50 cannot be taken out from the case 12 in an assembled state. Thus, the door 50 will not be removed from the case 12 by an impact when the recording tape cartridge 10 is dropped or the like. Moreover, the leader pin 22 is accommodated in the case 12 in a firmly shut state when the opening 20 has been closed by the door 50 at a time of non-use of the magnetic tape T. Therefore, the leader pin 22 is less likely to become damaged or soiled. Consequently, drawing out and running the magnetic tape T at the drive device will not affect the drive device, and the magnetic tape T itself will not suffer damage.

It is sufficient that the engaging protrusion 62 of the drive device be fixedly disposed to be engageable with the operation projection 52 simply by advancing into the slit 40 from the front side thereof. Thus, structure of the engaging protrusion 62 is simple. Further, because the door 50 closes the opening 20 due to the urging force of the coil spring 56, a mechanism is not required at the drive device for driving the door 50 in the direction of closing the opening 20. Thus, structure of opening/closing means (an opening/closing member) of the drive device can be made more simple.

Structure of Cell Retention Notch

The case 12 is also provided with the cell retention notch 58, which serves as a "recess portion" of the present invention. The cell retention notch 58 is formed substantially at a front-rear direction central portion in an arrow C side end portion of the upper case 16 (an end portion thereof at an opposite side in the left-right direction from the side thereof at which the opening 20 is provided). The cell retention notch 58 opens upward and leftward in, respectively, the ceiling plate 16B of the upper case 16 and a left wall 12C (a left side side wall, along the direction of arrow A, of the peripheral walls 16A and 18A) of the case 12.

Of outer surfaces of the wall portion that defines the cell retention notch 58, a surface that faces in the direction of arrow A serves as an engaging surface 58A. The engaging surface 58A engages with an engaging member 60 of the drive device, which is described below, during opening of the opening 20. The engaging surface 58A is set to be a surface substantially intersecting the direction of arrow A (but facing slightly upward) by setting a draft angle of the engaging surface 58A to be small (for example, if a draft angle of the front wall 12A, which structures a design surface, is 2°, a draft angle of approximately 0.5°).

With this structure, the engaging surface 58A engages (cooperates) with the engaging member 60 and counteracts torque (resists the torque) that acts on the case 12 when the engaging protrusion 62 engages with the operation projection 52 of the door 50 and opens the opening 20.

Corner portions of the case 12 (corner portions between the ceiling plate 16B and an upper end of the peripheral wall 16A, corner portions between the floor plate 18B and the peripheral wall 18A, and the like) are all rounded off with curves. However, by making depths of the cell retention notch 58 in a vertical direction and a sideways direction greater than radiuses of these curves, a significant surface area that enables engagement between the engaging surface 58A and the engaging member 60 is assured, and degrees of freedom of engineering and design of the case 12 are not adversely affected by this structure.

A bottom face of the cell retention notch 58 reaches as far down as a vicinity of a lower end of the peripheral wall 16A. Thus, a height (a position in the vertical direction) of engagement of the engaging surface 58A with the engaging member 60 matches a height of engagement with the engaging protrusion 62 of the operation projection 52 protruding outside through the slit 40.

Consequently, countertorque does not act on the case 12 when the aforementioned torque is counteracted. Further, because the slit 40 described above is disposed upward of the partition line, the cell retention notch 58 (the engaging surface 58A) can be made to match the respective engagement heights while having been formed in the upper case 16. Thus, formation of a slight stop at an abutting portion upward or downward of the engaging surface 58A, which would be a concern in a situation in which the engaging surface 58A was formed at abutment of the upper case 16 and the lower case 18, is prevented.

In this structure, because the cell retention notch 58 opens upward and leftward, directions from which the engaging member 60 of the drive device can gain access to the engaging surface 58A are broadened, and a degree of freedom of design of the drive device is broadened. In addition, machinability of the upper case 16 in which the draft angle of the engaging surface 58A is specified to be small as mentioned above is favorable.

Dimensions of the cell retention notch 58 are determined such that a pushing roller 90 (described later) of the later-described library apparatus 70 can enter thereinto. A surface in the cell retention notch 58 that faces in the direction of arrow C serves as a pushed face 58B. The pushed face 58B is pushed rightward (to the side of the right wall 12B, which is the side of the opening 20) by the pushing roller 90. Thus, with this structure, the case 12 has a structure which can be positioned in a holder portion 72 of the library apparatus 70. Hence, because the cell retention notch 58 (the pushed face 58B) is provided at a substantially central portion of the case in the front-rear direction, the case 12 can be moved without being noticeably angled with respect to the direction of arrow B when being pushed by the pushing roller 90.

The cell retention notch 58 is provided at the substantially central portion in the front-rear direction of the case 12 and the recess portion 48 is positioned below the cell retention notch 58 (in many alternative cases, a recess portion, hole or the like having any of various purposes is provided in the lower case 18). Therefore, although the cell retention notch 58 is provided in the upper case 16 in this structure, the cell retention notch 58 and the slit 40 could be formed at the lower case 18 side. However, if the engaging surface 58A is formed at the lower case 18, then the surface of the engaging surface 58A will be angled slightly downward with respect to the direction of arrow A because of the draft angle. Accordingly, it is preferable to provide the cell retention notch 58 (and the engaging surface 58A) at the upper case 16 as described above.

Next, operation of the present embodiment will be described.

In the recording tape cartridge 10 having the structure described above, the opening 20 is closed off by the door 50 when the recording tape cartridge 10 is not in use (during storage, during transportation, and the like). Specifically, a distal end portion (front end portion) of the door 50 is entered into the recess portion 30A of the diagonal wall portions 30 by the urging force of the coil spring 56. Together therewith, an intermediate portion outer peripheral surface of the door 50 abuts against the outer peripheral surface of the screw bosses 36 to close off the opening 20.

In contrast, when the magnetic tape T is to be used, the recording tape cartridge 10 is inserted into a bucket of the drive device along the direction of arrow A (i.e., loaded into the drive device). Accordingly, the engaging member 60 provided at the bucket is entered into the cell retention notch 58 of the case 12 from leftward or upward thereof by an unillustrated driving mechanism, spring force or the like, as shown in FIG. 5. In this state, the bucket moves in the drive device in the direction of arrow A, together with the recording tape cartridge 10.

In accordance with this movement (the operation of loading into the drive device, that is, movement relative to the drive device), the engaging protrusion 62, which serves as the opening/closing member structuring the opening/closing means of the drive device, advances into the slit 40 which opens frontward at the step portions 38, and engages with the operation projection 52 of the door 50.

As the bucket moves further in the direction of arrow A together with the recording tape cartridge 10 (the case 12), the urging force of the coil spring 56 is opposed by a moving force (i.e., a force that is moving the recording tape cartridge 10 and the bucket) and, as shown in FIG. 6, the engaging protrusion 62 moves the operation projection 52 substantially rearward (that is, relatively substantially rearward with respect to the case 12 which is moving in the direction of arrow A).

Thus, the door 50 from which the operation projection 52 protrudes is guided by the screw bosses 36, the protrusion portions 42, 44 and 46, and the guide surface 48A. At the same time, the door 50 rotates in a clockwise direction, in plan view, along the direction of curvature thereof (the door 50 moves substantially rearward so as to swing at the outer side of the pin stands 24 and the reel 14), and the door 50 opens up the opening 20.

At this time, the moving force applies torque (a moment of rotation in the direction of an arrow E shown in FIG. 6) about an engagement point of the operation projection 52 and the engaging protrusion 62. However, because the engaging member 60 engages with (abuts against) the engaging surface 58A of the case 12, the engaging member 60 applies a force to the case 12 in the direction of an arrow F so as to resist (counter) the torque in the direction of arrow E. Thus, the torque in the direction of arrow E is counteracted.

Consequently, the case 12 is properly loaded along the direction of arrow A at the drive device without rotating about the engagement point D of the operation projection 52 and engaging protrusion 62 and without being angled with respect to the direction of arrow A (and without chafing against the drive device). Furthermore, the door 50 moves smoothly, and opens up the 20.

Hence, when the bucket has moved by a predetermined amount, that is, when the case 12 (the recording tape cartridge 10) has been loaded to a predetermined depth in the drive device, as shown in FIG. 7, the opening 20 is completely open, the recording tape cartridge 10 is positioned in the drive device, and the door 50 is restricted from further rotation (substantially rearward movement).

In this state, the drawing-out means of the drive device advances into the case 12 through the opened opening 20, takes out the leader pin 22, which had been positioned and accommodated at the pin stands 24, and accommodates the leader pin 22 at a winding reel of the drive device. Then, the winding reel and the reel 14 are driven to rotate contemporaneously, and the magnetic tape T is wound around the winding reel while being sequentially drawn out from the case 12. Information recording/replaying is carried out on the magnetic tape T by a recording/replaying head or the like which is disposed along a predetermined tape path.

Subsequently, when the magnetic tape T has been wound back to the reel 14 and the recording tape cartridge 10 is to be ejected from the drive device, the state of positioning of the recording tape cartridge 10 is released and the recording tape cartridge 10 is moved in a direction opposite to the direction of arrow A, together with the bucket. After this movement, the engaging member 60 is taken out from the cell retention notch 58.

Accordingly, the door 50 is guided by the screw bosses 36, the protrusion portions 42, 44 and 46, and the guide surface 48A, while being rotated in the closing direction of the opening 20 by the urging force of the coil spring 56. The distal end portion of the door 50 enters into the recess portion 30A of the diagonal wall portions 30, and the door 50 returns to the initial state in which the opening 20 is completely closed.

Herein, when the opening 20 is open as described above, because the engaging member 60 engages with the engaging surface 58A of the cell retention notch 58, the torque acting on the case 12 is counteracted, and the case 12 is suitably loaded at the drive device along the direction of arrow A.

Further, because the engaging surface 58A formed at the cell retention notch 58, which is recessedly provided at a left side portion of the case 12 (at a location which does not structure a design surface), has a small draft angle, dimensional accuracy of the engaging surface 58A is high. Consequently, even though the engaging member 60 of the drive device engages (pushes) thereat for counteracting the torque, accuracy of positioning of the case 12 on the bucket is maintained.

Further still, because the draft angle of the engaging surface 58A is small, inclination of the case 12 upward or downward relative to the direction of arrow A is avoided. In particular, because the engaging surface 58A of the cell retention notch 58, which is die-cut from a side which opens upward, is inclined slightly upward relative to the direction of arrow A due to the draft angle, the case 12 is supported from below by the bucket (having been loaded on the bucket) during loading into the drive device. Therefore, when the engaging member 60 pushes against the engaging surface 58A, a portion of the pushing force is simply converted by the upward inclination into a pressing force which presses the case 12 downward. Thus, the case 12 will not be tilted upward or downward.

As a result, the case 12 is loaded into the drive device without being noticeably angled in either the left-right direction or the vertical direction with respect to the direction of arrow A, the movement force that acts on the door 50 in the direction of opening the opening 20 (a movement force of the bucket that acts when the engaging protrusion 62 engages with the operation projection 52) is not significantly diverted, and the door 50 opens the opening 20 smoothly.

Thus, when the door 50 is moved in an aperture opening direction by an operation of loading the recording tape cartridge 10 relating to the present embodiment at a drive device, inclination of the case 12 with respect to the loading direction (the direction of arrow A) can be prevented.

The cell retention notch 58 of the recording tape cartridge 10 with the above-described structure may be structured to provide a function of positioning the recording tape cartridge 10 in the library apparatus 70, which serves as a cartridge automatic conveyance device, instead of or in combination with the function of counteracting the aforementioned torque (engaging with the engaging member 60) when the opening 20 is opened at the drive device. Now, an example of the library apparatus 70 will be described on the basis of FIG. 8.

Figure 8:
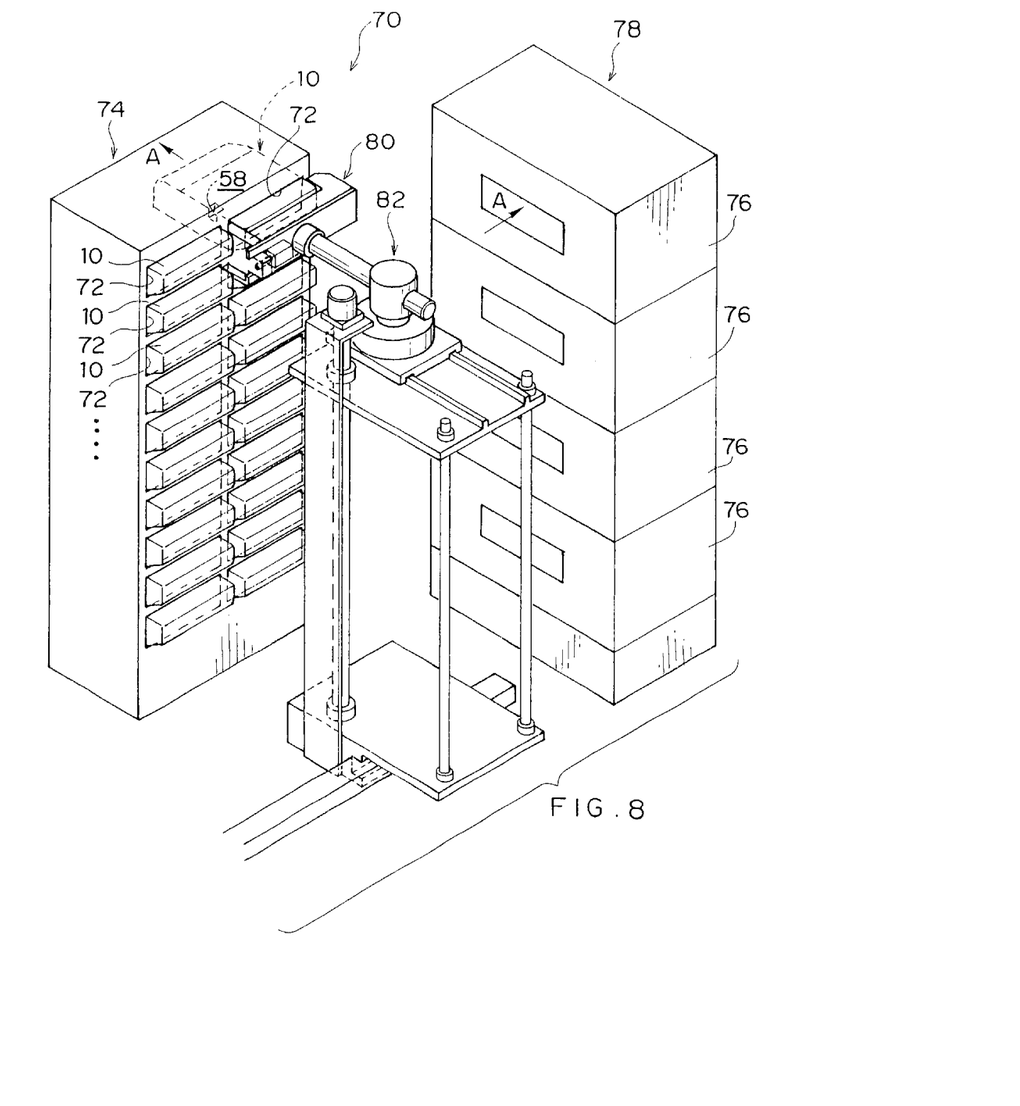
FIG. 8 is a perspective view showing schematic structure of a library device at which the recording tape cartridge relating to the embodiment of the present invention is utilized.

As shown in a schematic perspective view in FIG. 8, the library apparatus 70 is structured to include an accommodation shelf section 74, a recording/replaying section 78, and a movement mechanism section 82. The accommodation shelf section 74 includes a plurality of the holder portions 72 (magazines), which respectively serve as accommodation portions capable of accommodating the recording tape cartridge 10. One or a plurality (four in the present embodiment) of a drive device 76 is disposed at the recording/replaying section 78. The movement mechanism section 82 is capable of moving a chucking mechanism 80, which is capable of gripping a rear end side portion of the recording tape cartridge 10, between any of the holder portions 72 and any of the drive devices 76.

At the library apparatus 70, the recording tape cartridge 10 that is to be used is taken out from the holder portions 72 by the chucking mechanism 80 and movement mechanism section 82, and loaded into one of the drive devices 76 of the recording/replaying section 78. Subsequent to use, the recording tape cartridge 10 is taken out from the drive device 76 by the chucking mechanism 80 and movement mechanism section 82, and accommodated (loaded) at the holder portions 72 of the accommodation shelf section 74.

Thus, a plurality (a large number) of the recording tape cartridge 10 that are accommodated can be automatically and rapidly inserted and removed at the drive devices 76, and a large scale (large capacity) information backup system is constructed. Further, the library apparatus 70 nay have a structure which handles recording tape cartridges of a plurality of kinds, including the recording tape cartridge 10, and the holder portions 72 and the drive devices 76 may be provided with different specifications corresponding to those kinds.

Figure 9:
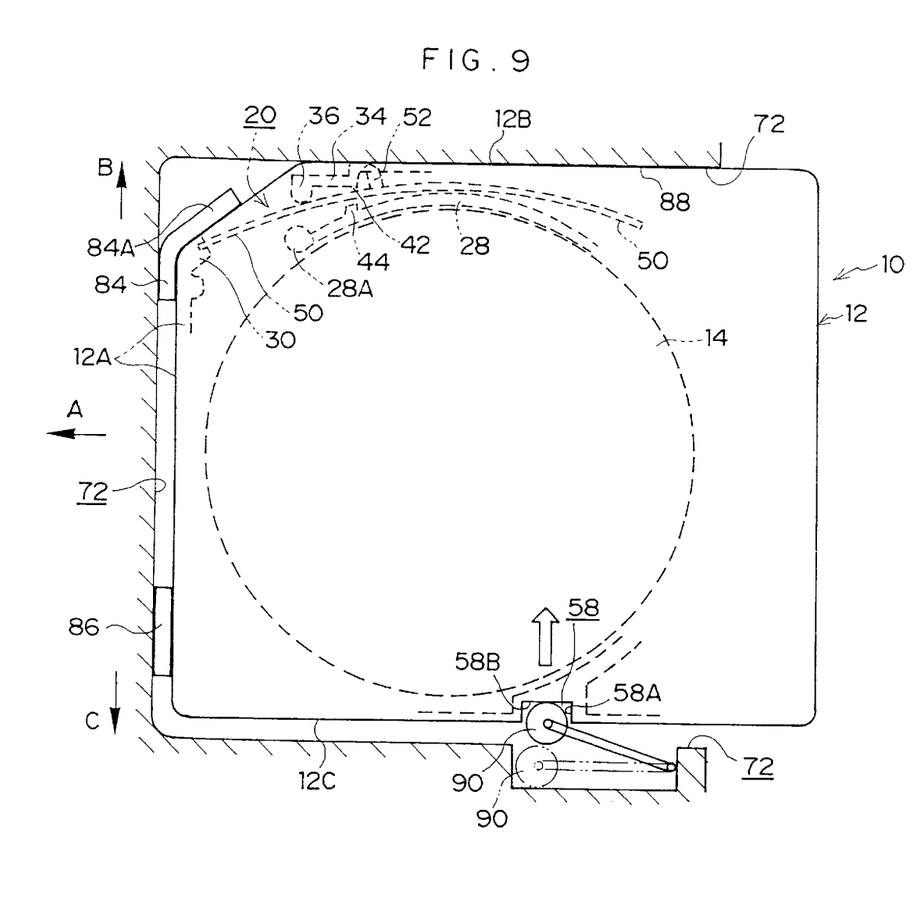
FIG. 9 is a plan view showing a state in which the recording tape cartridge relating to the embodiment of the present invention has been positioned in a holder of the library device.

Next, the holder portion 72 accommodating the recording tape cartridge 10 will be described. As shown in FIG. 9, at least a pair of positioning stoppers 84 and 86 are disposed, respectively at top and bottom, at an inwardmost portion of the interior of the holder portion 72. The positioning stoppers 84 and 86 are references for positioning in the front-rear direction. The positioning stopper 84, which is at the right side (the side of the opening 20), is provided with a diagonal portion 84A corresponding with the opening face of the opening 20 of the case 12. A right interior surface 88 of the holder portion 72 serves as a reference for positioning in the left-right direction.

The pushing roller 90 is disposed at a left end portion in the holder portion 72. When the case 12 (the recording tape cartridge 10) is accommodated in the holder portion 72, the pushing roller 90 is moved into the cell retention notch 58 by a spring force or the like and pushes the pushed face 58B so as to apply pressure in the direction of arrow B. Although the pushing roller 90 is provided in the present embodiment, any form of member or pushing mechanism that is capable of entering into the cell retention notch 58 and pushing the pushed face 58B may be provided in the holder portion 72.

When the recording tape cartridge 10 is accommodated in the holder portion 72 of the library apparatus 70 by the chucking mechanism 80 and movement mechanism section 82, the front wall 12A of the case 12 abuts against the positioning stoppers 84 and 86. In this state, the pushing roller 90 enters into the cell retention notch 58 and pushes against the pushed face 58B.

Hence, the case 12 is pushed (sideways) against the right interior surface 88 by the pushing force, and the front-right corner portion, which is cut away along the opening face of the opening 20, (the ceiling plate 16B and floor plate 18B that define the upper and lower ends of the opening 20) abuts against the diagonal portion 84A of the positioning stopper 84. Thus, the case 12 is positioned in the front-rear direction and the left-right direction. At this time, because the cell retention notch 58 is provided at the substantially central portion in the front-rear direction of the case 12, the case 12 is moved without being noticeably inclined relative to the direction of arrow B, and is appropriately positioned.

The pushing roller 90 maintains the state in which the pushing roller 90 is entered into the cell retention notch 58 and pushes against the pushed face 58B. Thus, the positioned state is maintained, and detachment of the case 12 (rearward movement) is prevented.

Identifying means for identifying a diagonal angle (by absence/presence of contacts, separation or the like) of the opening face of the opening 20 of the case 12 is provided in the holder portion 72, at the positioning stopper 84 or in a vicinity thereof. If a recording tape cartridge that does not correspond to that holder portion 72 is accommodated thereat, then the identifying means outputs a signal to the effect that that recording tape cartridge should be removed by the chucking mechanism 80 and movement mechanism section 82.

Thus, when the pushing roller 90 pushes the cell retention notch 58, the front-right corner portion of the case 12 abuts against the diagonal portion 84A of the positioning stopper 84 and is assuredly positioned. Therefore, identification of the recording tape cartridge 10 by the identifying means can be reliably achieved using the diagonal angle of the opening face of the opening 20.

The aforementioned positioning is achieved by pushing the cell retention notch 58, which is provided at the left side portion of the case 12, and there is no need to provide a recess portion corresponding to the cell retention notch 58 at a right side portion of the case 12. Therefore, the case 12 (and a mold for forming the upper case 16) is made simpler, there is no increase in parting resistance at a time of forming the upper case 16 due to an increase in contact area of the mold, and the occurrence of forming failures is suppressed. Moreover, because it is sufficient that the pushing roller 90 be provided at only one side in the holder portion 72, structure of the holder portion 72 is made simpler. Thus, a force for removal when the recording tape cartridge 10 is taken out from the holder portion 72 by the chucking mechanism 80 and movement mechanism section 82 (a force for taking out the pushing roller 90 from the cell retention notch 58 in opposition to a force urging the pushing roller 90 in the direction of pushing the case 12) can be specified to be smaller than in, for example, a structure in which the pushing roller 90 is provided at both sides, and the recording tape cartridge 10 can be taken out in a favorable manner.

Thus, the cell retention notch 58 has a structure which dually functions to counteract the aforementioned torque during opening of the opening 20 at the drive device and to position the case 12 in the holder portion 72 of the library apparatus 70 (that is, the single cell retention notch 58 is a structure which is utilized at both the drive device and the library apparatus 70), and a number of recess portions to be formed in the case 12 can be reduced. Therefore, the case 12 (and the mold used for forming the upper case 16) is made even simpler, and an increase in parting resistance is suppressed.

The cell retention notch 58 may, for example, be utilized for positioning the case 12 on the bucket simply by the engaging member 60 of the drive device pushing the pushed face 58B rightward (for example, for moving the case 12 to a position at which the operation projection 52 can engage with the engaging protrusion 62, for moving the case 12 to a position at which positioning pins of the drive device can be inserted into position-regulating holes provided at the hollow portions 28A and 28B, or the like). In such a case, components can be designed in common for the drive device and the library apparatus 70, which is desirable, by, for example, providing the drive device with the pushing roller 90 instead of the engaging member 60 or providing the holder portion 72 with the engaging member 60 instead of the pushing roller 90. Obviously, the cell retention notch 58 can still be structured to combine the function of positioning in the drive device (on the bucket) and the function of counteracting the aforementioned torque.

The embodiment described above has a preferable structure in which the recording tape cartridge 10 is provided with the opening 20, which is inclined with respect to the direction of arrow A, and the door 50 corresponding to the circular arc form movement path. However, the present invention is not limited thus. The cell retention notch 58 can be applied to a recording tape cartridge which is provided with any structure of an opening and a door (covering member) that opens the opening consequent to a loading operation into a drive device, and which is subjected to torque in the opening process. Accordingly, for example, the recording tape cartridge 10 may be structured with a door which slides along the direction of arrow A to open and close an opening which penetrates through the right wall 12B of the case 12, or the operation projection 52 may have a structure which is exposed to the outside through a slit formed in the floor plate 18B of the case 12.

Still further, the embodiment described above has a structure in which a magnetic tape T is employed as a recording tape. However, the present invention is not limited thus. It is sufficient that the recording tape is one of long tape-form information recording/replaying media which can record information and replay information that has been recorded. Of course, the recording tape cartridge relating to the present invention can be applied to recording tape of any kind of recording/replaying system.

As is explained above, a recording tape cartridge relating to the present invention has an excellent effect in that when a door is moved in a direction of opening an opening aperture by an operation of loading the cartridge into a drive device, inclination of a case with respect to a loading direction can be prevented.

What is claimed is:

1. A tape cartridge insertable into a tape drive that includes an opening member and an engaging member, which are capable of operatively engaging with the tape cartridge at a time of insertion of the tape cartridge, the tape drive carrying out at least one of reading and writing of data, the tape cartridge comprising:
   (a) a case;
   (b) a tape access opening provided at one side relative to a center line of the case, the center line extending in a direction of the insertion of the cartridge;
   (c) a covering member which is reciprocally moveable between a closed position for closing the tape access opening and an open position for opening the tape access opening;
   (d) an operation portion which cooperates with the opening member of the tape drive at the cartridge insertion time and moves the covering member in the direction of the open position; and
   (e) an engagement portion provided at the other side relative to the centre line of the case and capable of cooperating with the engaging member of the tape drive at the cartridge insertion time;
   wherein the case comprises: a front wall portion facing in the cartridge insertion direction; a side wall portion substantially parallel to the cartridge insertion direction; and an angled wall portion connecting the front wall portion and the side wall portion and angled relative to the cartridge insertion direction, and wherein the tape access opening is provided at the angled wall portion of the case.

2. The tape cartridge of claim 1, wherein the engagement portion comprises a recess portion of the case, the case recess portion being capable of engaging with the engaging member of the tape drive at the cartridge insertion time.

3. The tape cartridge of claim 2, wherein the tape cartridge is insertable and removable at predetermined apparatus other than the tape drive, and the predetermined apparatus includes a pushing member capable of engaging and pushing at the case recess portion for positioning the cartridge at a time of insertion of the cartridge at the predetermined apparatus.

4. The tape cartridge of claim 3, wherein the predetermined apparatus comprises an accommodation shelf portion for storage of a plurality of cartridges, which is included at a library apparatus.

5. The tape cartridge of claim 2, wherein the case comprises a slit which enables relative engagement of the opening member of the tape drive with the operation portion at the cartridge insertion time.

6. The tape cartridge of claim 5, wherein the case is structured with an upper case and a lower case.

7. The tape cartridge of claim 6, wherein the case recess portion and the slit are formed in either one of the upper case and the lower case.

8. The tape cartridge of claim 7, wherein the case recess portion opens in a sideways direction and a vertical direction orthogonal to the sideways direction.

9. The tape cartridge of claim 8, wherein the opening member of the tape drive and the engaging member of the tape drive are disposed at substantially the same level in the vertical direction.

10. The tape cartridge of claim 2, wherein the case recess portion is capable, at the cartridge insertion time, of cooperating with the engaging member of the tape drive and functioning to counterbalance movement of the covering member in the direction of the closed position.

11. The tape cartridge of claim 2, wherein
   the case comprises a front wall portion facing in the cartridge insertion direction and a side wall portion substantially parallel to the cartridge insertion direction,
   the case recess portion comprises an engagement surface,
   the case recess portion is formed at the side wall portion, and
   a draft angle of the engagement surface is smaller than a draft angle of the front wall portion.

12. The tape cartridge of claim 11, wherein the draft angle of the engagement surface is approximately 0.5 degree.

13. The tape cartridge of claim 11, wherein depths of the case recess portion in a sideways direction orthogonal to the cartridge insertion direction and a vertical direction orthogonal to the sideways direction are greater than a radius of curvature of a corner portion of the case.

14. The tape cartridge of claim 1, wherein the case appears substantially rectangular in plan view.

15. The tape cartridge of claim 1, wherein the operation portion is provided integrally at the covering member.

16. The tape cartridge of claim 1, wherein the covering member is reciprocally moveable along a circular arc-form movement path.

17. The tape cartridge of claim 1, further comprising an urging element which continuously urges the covering member in the direction of the closed position.

18. The tape cartridge of claim 1, further comprising a recording tape and a reel around which the recording tape is wound.

19. The tape cartridge of claim 18, further comprising a leader member attached to an end of the tape, and a retaining structure which detachably retains the leader pin at both sides in a longitudinal direction of the leader member.

20. A tape drive for carrying out at least one of reading and writing of data at an insertable and removable tape cartridge, the tape drive comprising:

(A) an opening member capable of operatively engaging with the tape cartridge at a time of insertion of the cartridge; and (B) an engaging member capable of operatively engaging with the tape cartridge at the cartridge insertion time, wherein (C) the tape cartridge includes: (a) a case; (b) a tape access opening provided at one side relative to a center line of the case, the center line extending in a direction of the insertion of the cartridge; (c) a covering member which is reciprocally moveable between a closed position for closing the tape access opening and an open position for opening the tape access opening; (d) an operation portion which cooperates with the opening member of the tape drive at the cartridge insertion time and moves the covering member in the direction of the open position; and (e) an engagement portion provided at the other side relative to the centre line of the case, which cooperates with the engaging member of the tape drive and is capable of implementing a counterbalancing function with respect to movement of the covering member in the direction of the closed position;

wherein the case comprises: a front wall portion facing in the cartridge insertion direction; a side wall portion substantially parallel to the cartridge insertion direction; and an angled wall portion connecting the front wall portion and the side wall portion and angled relative to the cartridge insertion direction, and wherein the tape access opening is provided at the angled wall portion of the case.

21. The tape drive of claim 20, further comprising a bucket which includes at least one guide wall for guiding the tape cartridge.

22. The tape drive of claim 21, wherein the opening member of the tape drive is fixed at the bucket.

23. The tape drive of claim 21, wherein the engaging member of the tape drive is moveably attached at the bucket.

24. The tape drive of claim 20, wherein the opening member of the tape drive projects in a direction crossing the cartridge insertion direction.

* * * * *